US011140265B1

(12) United States Patent
Palmer et al.

(10) Patent No.: US 11,140,265 B1
(45) Date of Patent: Oct. 5, 2021

(54) AUTOMATICALLY PROVIDING DIRECTIVES TO PARTIES TO AUDIO CALLS IN REAL-TIME WHILE THE CALLS ARE OCCURRING

(71) Applicant: Dialpad, Inc., San Francisco, CA (US)

(72) Inventors: James Palmer, Novato, CA (US); Etienne Manderscheid, San Francisco, CA (US)

(73) Assignee: DIALPAD, INC., San Ramon, CA (US)

( * ) Notice: Subject to any disclaimer, the term of this patent is extended or adjusted under 35 U.S.C. 154(b) by 59 days.

(21) Appl. No.: 16/362,287

(22) Filed: Mar. 22, 2019

(51) Int. Cl.
*H04M 3/493* (2006.01)
*H04M 3/42* (2006.01)
*G10L 15/22* (2006.01)
*H04M 3/487* (2006.01)

(52) U.S. Cl.
CPC .......... *H04M 3/4936* (2013.01); *G10L 15/22* (2013.01); *H04M 3/42221* (2013.01); *H04M 3/4874* (2013.01); *G10L 2015/223* (2013.01); *G10L 2015/227* (2013.01)

(58) Field of Classification Search
CPC .............................. G10L 15/22; H04M 3/4936
See application file for complete search history.

(56) References Cited

U.S. PATENT DOCUMENTS

| | | | | |
|---|---|---|---|---|
| 7,487,095 B2 * | 2/2009 | Hill | ..................... | G10L 15/1822 704/275 |
| 8,326,643 B1 * | 12/2012 | Eshkenazi | .............. | G06Q 30/02 705/1.1 |
| 2007/0032225 A1 * | 2/2007 | Konicek | ................. | H04W 4/80 455/417 |
| 2009/0060156 A1 * | 3/2009 | Burckart | ........... | H04M 1/72519 379/201.01 |
| 2016/0180844 A1 * | 6/2016 | VanBlon | ................. | G06F 3/167 704/275 |
| 2016/0191709 A1 * | 6/2016 | Pullamplavil | ........... | G10L 25/48 379/266.07 |
| 2019/0057698 A1 * | 2/2019 | Raanani | .................. | H04M 3/22 |

* cited by examiner

*Primary Examiner* — Shaun Roberts
(74) *Attorney, Agent, or Firm* — Patent Law Works LLP (57) ABSTRACT

The content and/or sound characteristics of audio calls are monitored in real-time. The occurrence of triggers during audio calls is automatically detected, and in response directives are displayed to parties in real-time while calls are occurring. Multiple triggers and directives can be defined and edited, either by human users and/or automatically (e.g., in response to results obtained and tracked over time). Each given directive corresponds to one or more given triggers, such that detection of an occurrence of a given trigger during a monitored audio call results in the automatic outputting of a corresponding directive.

22 Claims, 3 Drawing Sheets

AUTOMATICALLY PROVIDING DIRECTIVES TO PARTIES TO AUDIO CALLS IN REAL-TIME WHILE THE CALLS ARE OCCURRING

TECHNICAL FIELD

This disclosure pertains generally to computerized telephony and speech recognition technology, and more specifically to automatically outputting directives to parties to audio calls in response to detecting the occurrences of specific triggers while the calls are occurring.

BACKGROUND

An every larger share of phone calls are made from and processed by computing devices such as smartphones and personal computers. For example, Voice over Internet Protocol (VoIP) enables the delivery of voice communication over Internet Protocol (IP) networks, such as the public internet or private IP networks, as opposed to conventional public switched telephone network (PSTN). Processing VoIP telephone calls involves signaling, channel setup, digitization of the analog voice signals and encoding. Instead of being transmitted over a circuit switched network, the digital information is packetized, and IP packets are transmitted a packet switched network. Contemporary providers of VoIP enable dynamic interconnection between users on any two domains on the internet, using VoIP phones, or VoIP software running on personal computers, smartphones or other devices capable of running applications and connecting to a network.

VoIP has many advantages over conventional PSTN telephony, including bandwidth efficiency, pricing and convenience. More generally, using computing devices to make and manage audio calls enables the integration of many new features in this context. It is desirable to leverage opportunities provided by the application of computerized processing and analysis to digitized content of audio calls.

SUMMARY

The occurrence of triggers during audio calls is automatically detected, and in response directives are displayed to parties in real-time while calls are occurring. It is to be understood that as used herein, the term "audio calls" includes not only audio calls between two parties, but conference calls as well. In addition, "audio calls" as used herein includes the audio portion of video calls and video conferences. Real-time recommendations can be made to sales agents in response to objections or questions raised by potential purchasers. Multiple triggers and directives can be defined and edited, either by human users and/or automatically (e.g., in response to results obtained and tracked over time). Each given directive corresponds to one or more given triggers, such that detection of an occurrence of a given trigger during a monitored audio call results in the automatic outputting of a corresponding directive. Calls can be monitored for both speech recognition and auditory characteristics such as pitch, timbre, intonation, etc.

Examples of triggers include a party to a monitored audio call speaking a specific word or combination of words, and/or specific characteristics of sound such as pitch, duration, timbre, loudness, etc. Triggers can also take into account specific circumstances or events that occur during calls, such as resolution of an issue, non-resolution of an issue, raising of an objection, an apology, a request for a refund, a perceived or detected mood of a party to the monitored audio call, a request for a future action by any party to the call (e.g., email me tomorrow), a mention of a price or other monetary matter, a mention of a specific date and/or time, a question, an interruption, or a pause for a specific length of time. The correspondence between triggers and directives can be instantiated at any level of granularity.

The content and/or sound characteristics of audio calls are automatically monitored in real-time, while calls are occurring. This can take the form of performing speech recognition on calls, and converting speech to text. Further, the text can be automatically punctuated based on natural language processing of the content of the text, and based on sound characteristics.

Triggers that occur during monitored calls are automatically detected. Contextual factors can be taken into account in the detection process, such as the type of the call, purpose of the call, identify of at least one party to the call, location of at least one party to the call, organization associated with at least one party to the call, time of the call, etc. In response to detecting the occurrence of a specific trigger, a corresponding directive is automatically output to a specific party to the audio call, on a screen of a calling device operated by the party, such as a personal computer or smart phone.

The occurrence of clearance criteria associated with given output directives can also be automatically detected during monitored audio calls, such as the directed party having said specific phrases after the display of the directive, thereby having complied with the recommendation. In response to detecting the occurrence of clearance criteria, the display of the directive is automatically stopped. In some implementations, a party can simply indicate that s/he is done with the displayed directive (e.g., by clicking on a user interface component or the like).

The occurrence of triggers, outputting of directives, and corresponding results of this activity during multiple monitored audio calls can be tracked over time. Statistics concerning such tracked data can be compiled, and provided to users such as supervisors and managers. In addition, information concerning the occurrence of triggers during a specific ongoing call, the resulting outputting of directives, and the detected results thereof can be displayed to parties to the given call (as well as other parties such as supervisors) in real-time, while the call is occurring.

Machine learning techniques can also be applied to the tracked occurrences of triggers, corresponding outputting of directives, and corresponding results. The machine learning can be used in this context to perform actions such as creating new triggers, editing existing triggers, creating new directives corresponding to specific triggers, and editing existing directives, at any level of granularity.

The features and advantages described in this summary and in the following detailed description are not all-inclusive, and particularly, many additional features and advantages will be apparent to one of ordinary skill in the relevant art in view of the drawings, specification, and claims hereof. Moreover, it should be noted that the language used in the specification has been principally selected for readability and instructional purposes, and may not have been selected to delineate or circumscribe the inventive subject matter, resort to the claims being necessary to determine such inventive subject matter.

The Figures depict various example implementations for purposes of illustration only. One skilled in the art will readily recognize from the following discussion that alternative examples of the structures and methods illustrated herein may be employed without departing from the principles described herein.

DETAILED DESCRIPTION

A real-time directive providing system 101 monitors the content and/or sound characteristics of audio calls, and automatically detects the occurrence of triggers during calls in real-time, while the calls are occurring. In response to detecting triggers, the real-time directive providing system 101 automatically displays corresponding directives to parties during the calls. Multiple triggers and directives can be defined and edited, either by human users and/or automatically (e.g., in response to results obtained and tracked over time). Each given directive corresponds to one or more given triggers. The detection of an occurrence of a given trigger during a monitored audio call results in the automatic outputting of a corresponding directive.

Figure 1:
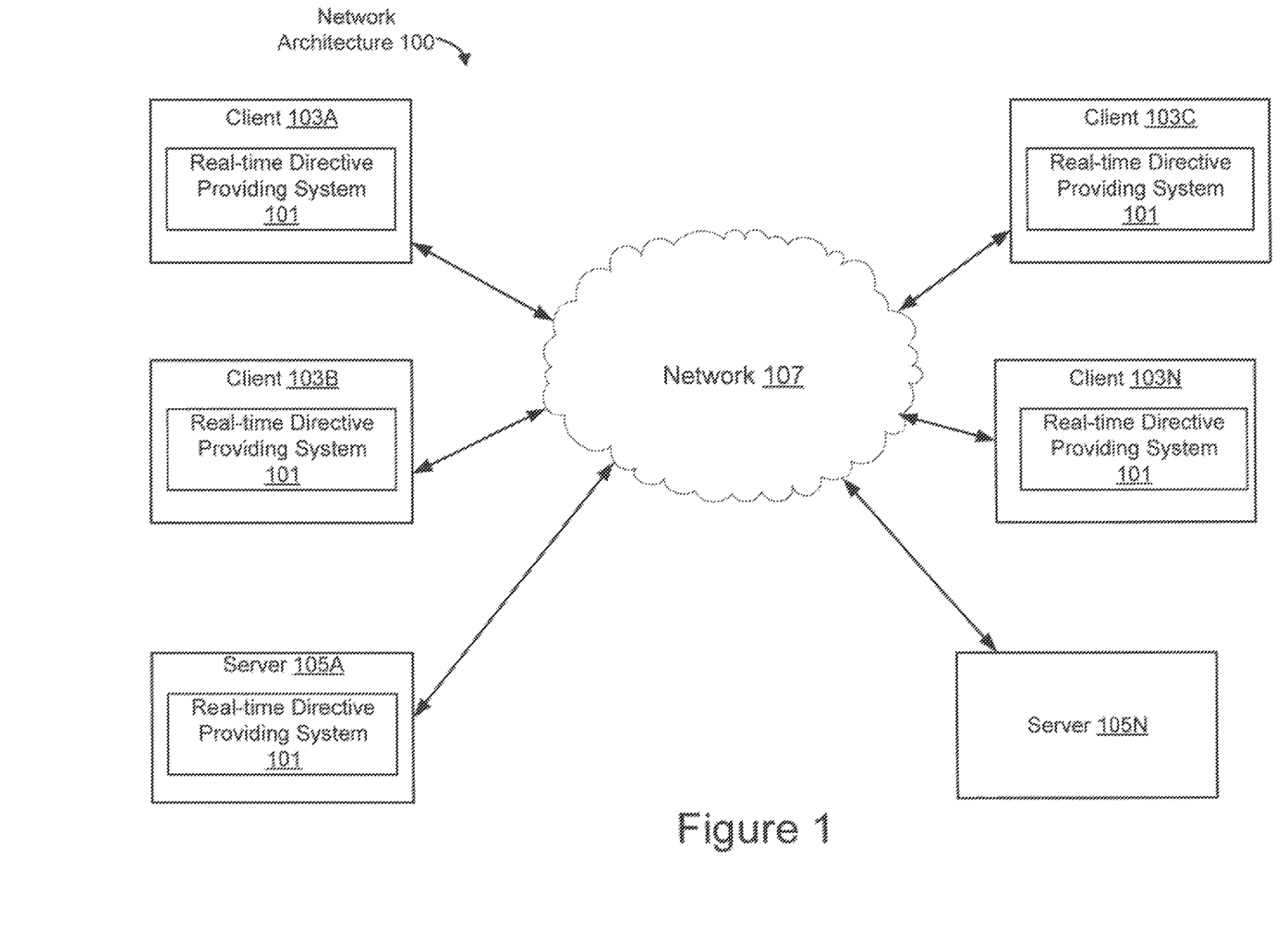
FIG. 1 is a block diagram of an exemplary network architecture in which a real-time directive providing system can be implemented.

FIG. 1 is a block diagram illustrating an exemplary network architecture 100 in which a real-time directive providing system 101 can be implemented. In the illustrated network architecture 100, endpoint systems 103A, 103B, 103C and 103N, as well as servers 105A and 105N, are communicatively coupled to a network 107. It is to be understood that in practice orders of magnitude more endpoints 103 and servers 105 can be deployed. A real-time directive providing system 101 is illustrated as residing on each endpoint (103A, 103B, 103C and 103N), as well as on server 105A. It is to be understood that in different implementations the real-time directive providing system 101 can reside on different computers 210, or be distributed between multiple computing systems 210 in different ways as desired.

Many different networking technologies can be used to provide connectivity from each of endpoint computer systems 103A-N and servers 105A-N to network 107. Some examples include: LAN, WAN, and various wireless technologies. Endpoint systems 103A-N are able to access applications and/or data on server 105A or 105N using, for example, a web browser or other endpoint software (not shown). Endpoints 103 can be in the form of, for example, desktop computers, laptop computers, smartphones or other mobile or wearable computing devices, comprising portable computer systems capable of connecting to a network 107 and running applications. Servers 105 can be in the form of, for example, rack mounted or tower computers.

Although FIG. 1 illustrates four endpoints 103A-N and two servers 105A-N as an example, in practice many more (or fewer) computers can be deployed as noted above. In one implementation, the network 107 is in the form of the internet. Other networks 107 or network-based environments can be used in addition to or instead of the internet in other implementations.

Figure 2:
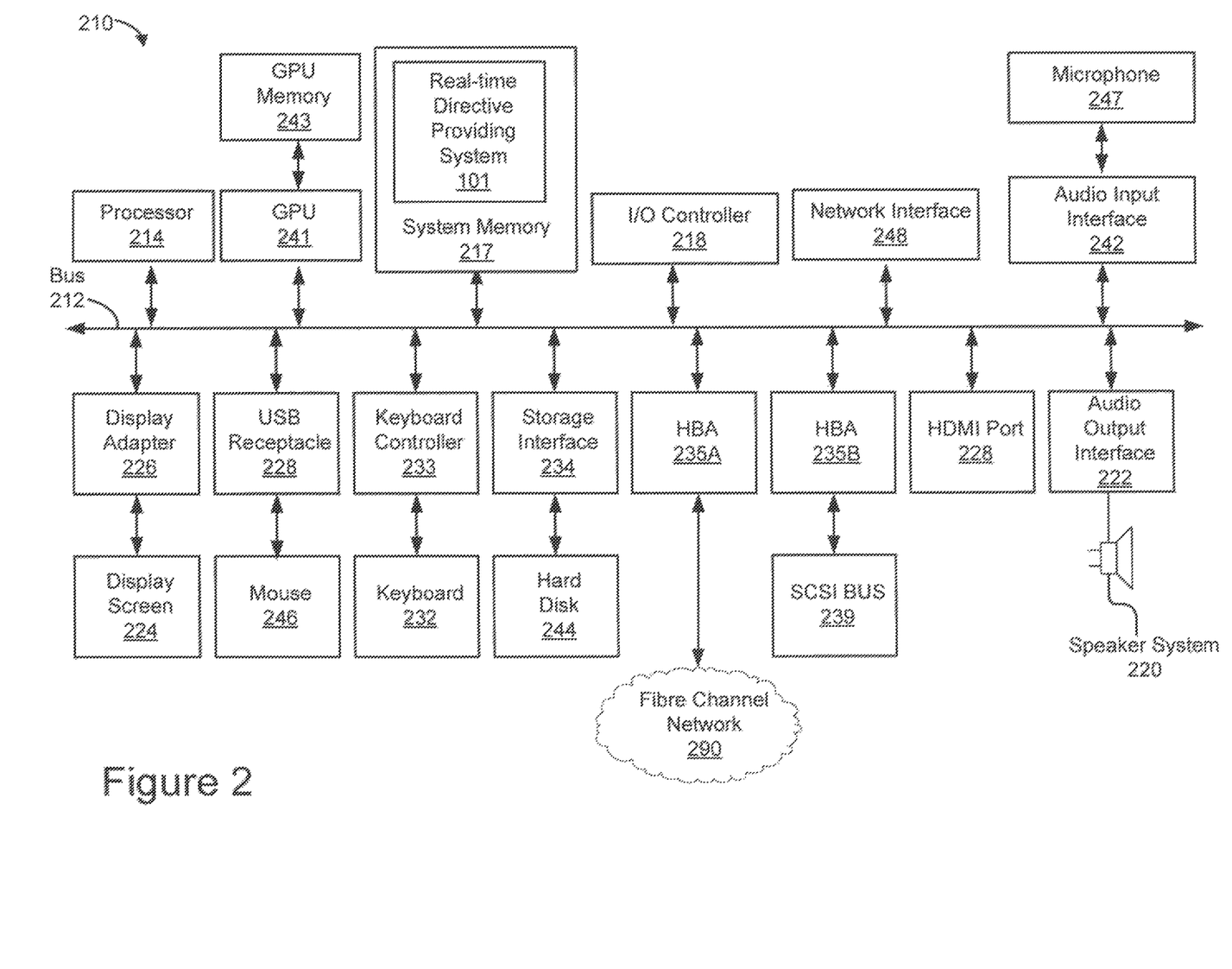
FIG. 2 is a block diagram of a computer system suitable for implementing a real-time directive providing system.

FIG. 2 is a block diagram of a computer system 210 suitable for implementing a real-time directive providing system 101. Endpoints 103 and servers 105 can all be implemented in the form of such computer systems 210. As illustrated, one component of the computer system 210 is a bus 212. The bus 212 communicatively couples other components of the computer system 210, such as at least one processor 214, system memory 217 (e.g., random access memory (RAM), read-only memory (ROM), flash memory), a graphics processing unit (GPU) 241, GPU memory 243, an input/output (I/O) controller 218, an audio input interface 242 communicatively coupled to an audio input device such as a microphone 247, an audio output interface 222 communicatively coupled to an audio output device such as a speaker 220, a display adapter 226 communicatively coupled to a video output device such as a display screen 224, one or more interfaces such as Universal Serial Bus (USB) ports 228, High-Definition Multimedia Interface (HDMI) ports 230, serial ports (not illustrated), etc., a keyboard controller 233 communicatively coupled to a keyboard 232, a storage interface 234 communicatively coupled to one or more hard disk(s) 244 (or other form(s) of storage media), a host bus adapter (HBA) interface card 235A configured to connect with a Fibre Channel (FC) network 290, an HBA interface card 235B configured to connect to a SCSI bus 239, a mouse 246 (or other pointing device) coupled to the bus 212, e.g., via a USB port 228, and one or more wired and/or wireless network interface(s) 248 coupled, e.g., directly to bus 212.

Other components (not illustrated) may be connected in a similar manner (e.g., document scanners, digital cameras, printers, etc.). Conversely, all of the components illustrated in FIG. 2 need not be present (e.g., smartphones and tablets typically do not have external keyboards 242 or external pointing devices 246, although various external components can be coupled to mobile computing devices via, e.g., USB ports 228). In different implementations the various components can be interconnected in different ways from that shown in FIG. 2.

The bus 212 allows data communication between the processor 214 and system memory 217, which, as noted above may include ROM and/or flash memory as well as RAM. The RAM is typically the main memory into which the operating system and application programs are loaded. The ROM and/or flash memory can contain, among other code, the Basic Input-Output system (BIOS) which controls certain basic hardware operations. Application programs can be stored on a local computer readable medium (e.g., hard disk 244, solid state drive, flash memory) and loaded into system memory 217 and executed by the processor 214. Application programs can also be loaded into system memory 217 from a remote location (i.e., a remotely located computer system 210), for example via the network interface 248. In FIG. 2, the real-time directive providing system 101 is illustrated as residing in system memory 217. The workings of the real-time directive providing system 101 are explained in greater detail below in conjunction with FIG. 3.

The storage interface 234 is coupled to one or more hard disks 244 (and/or other standard storage media). The hard disk(s) 244 may be a part of computer system 210, or may be physically separate and accessed through other interface systems.

The network interface 248 can be directly or indirectly communicatively coupled to a network 107 such as the internet. Such coupling can be wired or wireless.

Figure 3:
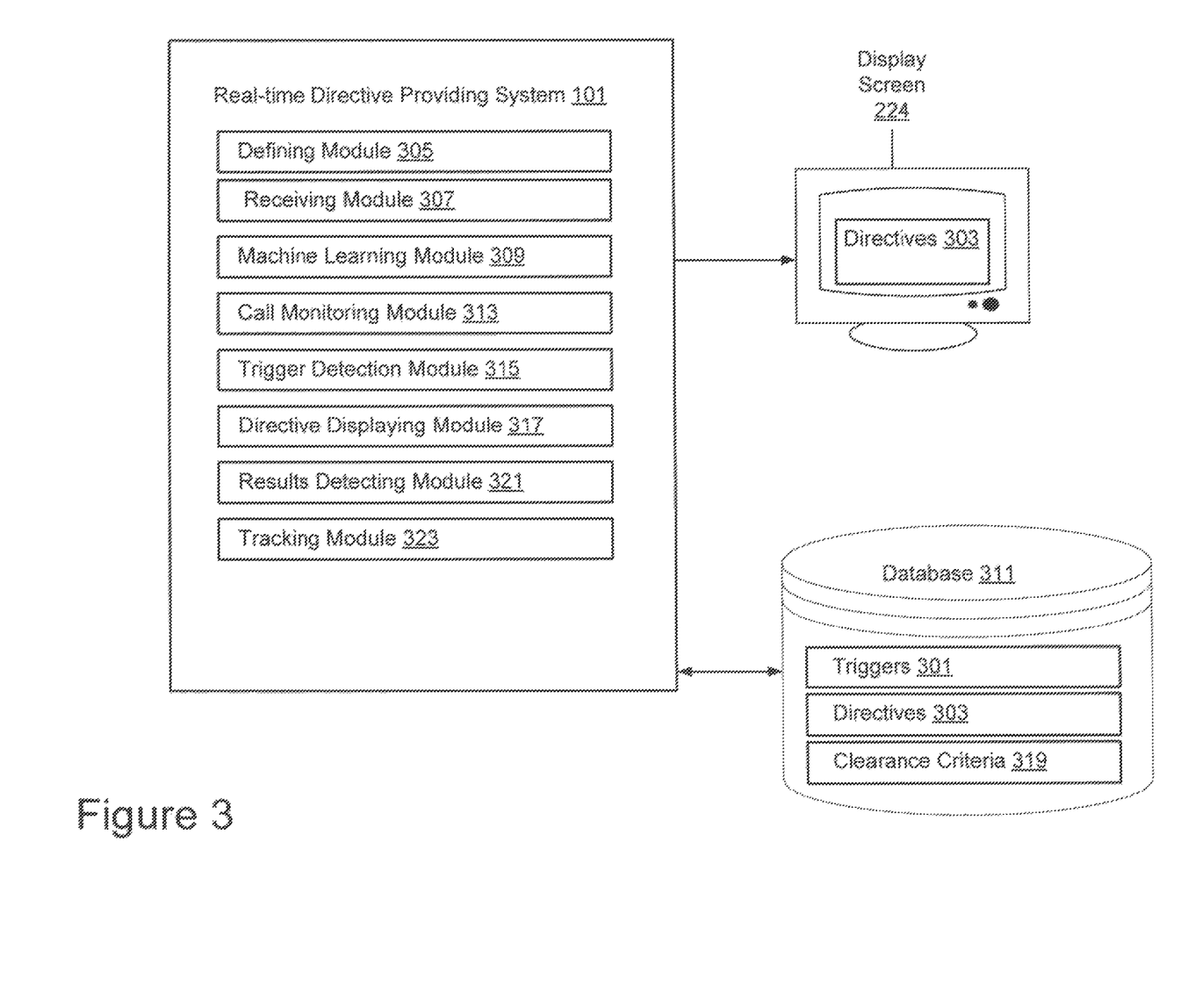
FIG. 3 is a high level block diagram of an exemplary operation of a real-time directive providing system.

FIG. 3 illustrates a real-time directive providing system 101 running on an endpoint 103. As described above, the functionalities of the real-time directive providing system 101 can reside on specific computers 210 (endpoints 103, servers 105) or be otherwise distributed between multiple computer systems 210, including within a fabric/cloud-based computing environment in which the functionality of the real-time directive providing system 101 is provided as a service over a network 107. It is to be understood that although the real-time directive providing system 101 is illustrated in FIG. 3 as single entity, the illustrated real-time directive providing system 101 represents a collection of functionalities, which can be instantiated as a single or multiple modules as desired (an instantiation of a specific, multiple module real-time directive providing system 101 is illustrated in FIG. 3). It is to be understood that the modules of the real-time directive providing system 101 can be instantiated (for example as object code or executable images) within the system memory 217 (e.g., RAM, ROM, flash memory) (and/or the GPU memory 243) of any computer system 210, such that when the processor(s) 214 (and/or the GPU 241) of the computer system 210 processes a module, the computer system 210 executes the associated functionality. In some implementations, the GPU 241 can be utilized for some or all of the processing of given modules of the real-time directive providing system 101, such as the trigger detecting module 315, the machine learning module 309, and/or other modules as desired. In different implementations, the functionality of some or all of the modules of the real-time directive providing system 101 can utilize the CPU(s) 214, the GPU 241, or any combination thereof, as well as system memory 217, GPU memory 243, or any combination thereof as desired.

As used herein, the terms "computer system," "computer," "endpoint," "endpoint computer," "server," "server computer" and "computing device" mean one or more computers configured and/or programmed to execute the described functionality. Additionally, program code to implement the functionalities of the real-time directive providing system 101 can be stored on computer-readable storage media. Any form of tangible computer readable storage medium can be used in this context, such as magnetic, optical or solid state storage media. As used herein, the term "computer readable storage medium" does not mean an electrical signal separate from an underlying physical medium.

In order to detect triggers 301 during monitored calls and display corresponding directives 303, multiple triggers 301 and corresponding directives 303 to be displayed can be defined. For example, users (e.g., authorized users, supervisors or the like) can define sets of triggers 301 (e.g., agent or customer keywords, occurrences of given scenarios during calls, etc.) and corresponding directives 303 to display in response (e.g., information to display on the screen to the caller including rich text, links, etc.). Users with an appropriate level of permission (e.g., managers and such) can definition triggers 301 and directives 303 by interacting with a defining module 305 of the real-time directive providing system 101 (e.g., via a user interface or the like), as installed, for example, on a server 105 within a given enterprise or other organization. Which users are authorized to define triggers 301 and directives 303 is a variable parameter, which can be configured by an administrator or the like.

Authorized users can define triggers 301 based on various elements of conversations in different implementations, including elements such as keywords or phrases, specific occurrences within conversations, numbers of questions asked, given filler words, interruptions, speech speed, tone, energy, etc. Triggers 301 can be defined specifically for callers in different roles (e.g., either or both sides of a call, such as sales agent and/or prospective customer). In different implementations triggers 301 can be defined based on various factors and combinations of factors at any level of granularity, such as a specific party to a monitored call speaking a specific word or a specific combination of words, optionally in combination with a specific sound characteristic, such as pitch or change thereto, duration of one or more words, pauses, timbre, loudness including increasing or decreasing volume of speech, etc. Specific circumstances detected as occurring during monitored audio calls can also be factored into triggers 301, such as the resolution (or non-resolution of an issue) during a call, the raising of an objection, the utterance of an apology, a request for a refund, a perceived or detected mood of a given party on the call, one or more questions being asked, an interruption, a pause of specific length of time, etc.

Authorized users are also able to define specific directives 303 to display to parties in response to the occurrence of given triggers 301 during a call. As described in more detail below, such directives 303 can be displayed to one or more parties to a call in real-time while the call is occurring, thus taking the form of real-time recommendations. The scope of directives 303 can be defined, based on properties such as name, team, role, or other key identifiers or callers from within a given organization, as well as properties of other parties such as customer name, vertical, organization size, location, or other available information. The content of directives 303 are variable design choices, but can be in the form of instructions to a caller, for example providing a script for responding to a given objection raised by a customer. In various implementations directives 303 can include text, graphics, links, etc. Directives 303 can be associated with triggers 301 at any desired level of granularity.

A receiving module 307 of the real-time directive providing system 101 receives triggers 301 and associated directives 303, from the defining module 305 described above, and/or from a machine learning module 309 described in more detail below. As explained above, each given directive 303 corresponds to at least one given trigger 301. The detection of the occurrence of a given trigger 301 during a monitored audio call results in the automatic outputting of a given corresponding directive 303. The triggers 301 and corresponding directives can be stored, for example in database 311 or other suitable storage mechanism.

Referring now to an instantiation of a real-time directive providing system 101 residing on a computing device that a party uses to make audio calls (e.g., a personal computer or smart phone), a call monitoring module 313 automatically monitors audio calls made by the user, in real-time while the calls are occurring. This monitoring of calls can take the form of performing speech recognition on the audio calls (e.g., converting speech of the monitored calls to text). Computerized speech recognition (sometimes known as automatic speech recognition or speech to text) enables the recognition of spoken language, and its automatic conversion into text by computers. Further, the text can be automatically punctuated based on natural language processing of the content of the text, and sound characteristics, such as raising pitch indicative of a question mark, pauses indicative of commas, etc. In addition to monitoring content of the audio call, the call monitoring module 313 can automatically monitor sound characteristics, such as pitch, duration, timbre, intonation, loudness, etc.

A trigger detecting module 315 of the real-time directive providing system 101 automatically detects the occurrence of specific triggers during monitored audio calls, in real-time as the calls are occurring. The determination process can take into account context of the audio call, such as the type of the call (e.g., sales call, tech support call, customer service call, etc.), purpose of the call, identity or role of one or more of the parties to the call, location of one or more of the parties to the call, the identity of or other factors concerning the organization(s) with which one or more of the parties are affiliated, the time of day during which the call is occurring, the length of the call, etc.

In response to detecting the occurrence of a specific trigger 301, a directive displaying module 317 of the real-time directive providing system 101 automatically outputs a specific corresponding directive 303 to a party to the audio call, on a screen of the calling device being operated by the party, in real-time as the call is occurring. The displayed directive 303 corresponds to the occurrence of the specific trigger 301 during the call. This can take the form of automatically popping-up suggestions to callers based on the occurrence of a defined trigger (e.g., specific words). For example, if a prospect mentions the name of a competitor during a sales call, the salesperson can be prompted with specific language to use to describe advantages of the organization's products over that of the given competitor. Sales call are by no means the only use cases for the real-time directive providing system 101. For example, technical support representatives can be prompted with specific solutions or mitigation instructions for specific technical problems mentioned by callers, customer support personal can be prompted with language to address specific complaints or types of complaints, etc. As noted above, directives 303 can be mapped to triggers at any level of granularity, taking into account monitored content of the call, the parties involved, circumstances concerning the call, other contextual information, etc.

As with triggers 301, clearance criteria 319 can be defined and otherwise determined, indicating when a caller has finished complying with or otherwise processing a displayed directive. The occurrence of such clearance criteria 319 are associated with given directives 303, and can be stored in the database 311. The occurrence of clearance criteria 319 during monitored audio calls can be automatically detected by the real-time directive providing system 101. In response to detecting the occurrence of such clearance criteria 319, the real-time directive providing system 101 automatically ceases to output the associated directive 303. For example, clearance criteria 319 associated with a specific directive 303 can be in the form of the directed party having said specific phrases after the display of the directive 303, thereby having complied with the recommendation. In response to detecting the occurrence of clearance criteria 319, the display of the directive 303 is automatically stopped, and the directive 303 can be classified as having been completed. In some implementations, a party can simply indicate that s/he is done with the displayed directive 303 (e.g., by clicking on a user interface component or the like), in which case the directive can be classified as complete, and the display thereof ceased.

A results detecting module 321 of the real-time directive providing system 101 can detect the results of displayed directives 303, i.e., what is said next (e.g., by the other party to the call) after a directive 303 is completed. By automatically detecting results of outputting specific directives 303 to specific parties in response to specific triggers 301, the effectiveness of different directives 303 can be tracked over time as described in detail below, and the directives 303 can be redeployed, edited, tweaked, discontinued, etc., as desired.

The real-time directive providing system 101 can automatically output information concerning the occurrence of the specific triggers 301 during monitored audio calls, the resulting display of directives 303 to different parties, and the detected results of the outputting of these directives 303, in real-time while the call is occurring. For example, a supervisor or the like could monitor this information in real-time as multiple calls are being conducted (for example by various members of a sales team), and see indications of information such as which recommendations are being shown to which agents in response to which occurrence, the real-time effectiveness of these directives, etc. Transcripts and reports can also be automatically generated after the completion of given calls, and provided to supervisors, parties to the call, etc. These reports can document specific triggers 301 that occurred during the call, the resulting outputting of the corresponding directives 303, and the detected results of these recommendations.

A tracking module 323 of the real-time directive providing system 101 can tracks the occurrences of triggers, the corresponding output directives, and detected results of these activities over the course of multiple monitored calls. Statistics concerning this tracked information can be compiled at any level of granularity. Compiled statistics and other information concerning this tracked data can be provided to users such as supervisors and managers. This enables supervisors to know which directives are triggered over time, and how the real-time display of these directives affects call outcomes. Supervisors can thus act on this information to highlight results with their teams, learn which recommendation are and are not effective, etc. As noted, this tracking can be performed and reported at varying levels of granularity as desired, such as which triggers 303 occur most frequently during given types of calls, which real-time directives 303 are displayed most frequently over given time intervals, improvements in call outcomes with real-time directive usage, real-time directive analytics, clearance of real-time directives (manual and automatic), creation and sharing of real-time directives over time, etc.

Results and tracked information can also be input into a machine learning module 309 of the real-time directive providing system 101. The machine learning module 309 can apply machine learning techniques to the tracked occurrences of triggers 301, corresponding outputting of directives 303, and corresponding results. The machine learning can be used in this context to perform actions such as creating new triggers 301, editing existing triggers 301, creating new directives 303 corresponding to specific triggers 301, and editing existing directives 303, at any level of granularity.

The use of the real-time directive providing system 101 as described herein enables agents and other callers to present the most effective information and arguments to customers, at any given time. For example, a rep may sometimes forget (or may have never learned) the most effective things to say in response to particular customer questions on a call. The real-time directive providing system 101 can automatically detect when these questions are asked, and prompt the rep with best practice responses. In addition, supervisors can track the performance of their team members. For example, a supervisor may not have confidence that agents are following the best practices. By displaying real-time recommendations on the screen to the agents and informing the supervisor of this in real-time, the supervisor can automatically monitor adherence statistics, measure compliance and track non-compliant reps. In addition, the real-time directive providing system 101 can automatically track results, thereby enabling supervisors to verify which practices are more effective over time, and adapt these practices where appropriate.

As will be understood by those familiar with the art, the invention may be embodied in other specific forms without departing from the spirit or essential characteristics thereof. Likewise, the particular naming and division of the portions, modules, agents, managers, components, functions, procedures, actions, layers, features, attributes, methodologies, data structures, and other aspects are not mandatory, and the mechanisms that implement the invention or its features may have different names, divisions and/or formats. The foregoing description, for purpose of explanation, has been described with reference to specific examples. However, the illustrative discussions above are not intended to be exhaustive or limiting to the precise forms disclosed. Many modifications and variations are possible in view of the above teachings. The examples were chosen and described in order to best explain relevant principles and their practical applications, to thereby enable others skilled in the art to best utilize various examples with or without various modifications as may be suited to the particular use contemplated.

What is claimed is:

1. A computer implemented method, comprising:
    automatically monitoring, by a computing device, an audio call, in real-time while the audio call is occurring, wherein the audio call is between a first party at a first calling device and a second party at a second calling device;
    performing speech recognition, by the computing device, on the audio call, in real-time while the audio call is occurring;
    automatically detecting, by the computing device, an occurrence of a specific trigger during the monitored audio call based on a determination of a specific keyword or combination of keywords said by the first party to the audio call;
    in response to detecting the occurrence of the specific trigger, automatically outputting, by the computing device, a directive to the second party to the audio call, on a screen of a second calling device operated by the second party to the audio call, the output directive corresponding to a suggested response of the second party to questions, objections, and complaints of the first party based on the occurrence of the specific trigger said by the first party;
    automatically generating, by the computing device, a report documenting the detection of the specific trigger during the monitored audio call and the resulting outputting of the directive to the second party to the audio call; and
    wherein the report has a selectable level of granularity for reporting at least one of: 1) triggers occurring most frequently during given types of audio calls and 2) which real-time directives are displayed most frequently over given time intervals.

2. The method of claim 1 wherein the specific trigger further comprises:
    a specific characteristic of sound monitored during the audio call.

3. The method of claim 2 wherein the specific characteristic of sound monitored during the audio call further comprises a specific characteristic from a group of characteristics consisting of:
    pitch, a change in pitch, duration, a pause, timbre, a change in timbre, intonation, a change in intonation, loudness, and a change in loudness.

4. The method of claim 1 wherein the first party is a customer and the second party is an agent.

5. The method of claim 4 wherein performing speech recognition, by the computing device, on the audio call in real-time while the audio call is occurring further comprises:
    converting speech of the monitored audio call to text, by the computing device, in real-time while the audio call is occurring.

6. The method of claim 5 wherein converting speech of the audio call to text in real-time while the audio call is occurring further comprises:
    punctuating text based on characteristics of sound monitored during the audio call, and/or based on natural language processing of content of the text, by the computing device, in real-time while the audio call is occurring.

7. The method of claim 1 wherein automatically monitoring an audio call in real-time while the audio call is occurring further comprises:
    automatically monitoring sound characteristics of the audio call, in real-time while the audio call is occurring.

8. The method of claim 7 wherein automatically monitoring sound characteristics of the audio call, in real-time while the audio call is occurring further comprises:
    automatically monitoring pitch, timbre, intonation, and/or loudness of the audio call, in real-time while the audio call is occurring.

9. The method of claim 1 wherein automatically detecting the occurrence of the specific trigger during the monitored audio call further comprises:
    basing a determination that the specific trigger has occurred at least partially on context of the audio call.

10. The method of claim 9 wherein context of the audio call consists of at least one contextual factor from a group of contextual factors consisting of:
    type of the audio call, purpose of the audio call, identify of at least one party to the audio call, location of at least one party to the audio call, organization associated with at least one party to the audio call, and time of the audio call.

11. The method of claim 1 further comprising:
    automatically detecting, by the computing device, an occurrence of clearance criteria during the monitored audio call, the detected clearance criteria being associated with the outputting of the directive; and
    in response to detecting the occurrence of the clearance criteria, automatically ceasing to output the associated directive, by the computing device.

12. A computer implemented method, comprising:
    automatically monitoring, by a computing device, an audio call, in real-time while the audio call is occurring, wherein the audio call is between a first party at a first calling device and a second party at a second calling device, wherein the first party is a customer and the second party is an agent;
    performing speech recognition, by the computing device, on the audio call, in real-time while the audio call is occurring;
    automatically detecting, by the computing device, an occurrence of a specific trigger during the monitored audio call based on a determination of a specific keyword or combination of keywords said by the first party to the audio call;
    in response to detecting the occurrence of the specific trigger, automatically outputting, by the computing device, a directive to the second party to the audio call, on a display of a second calling device operated by the second party to the audio call, the output directive corresponding to a suggested response of the second party to a question, objection, or complaint of the first party based on the occurrence of the specific trigger said by the first party;

automatically detecting, by the computing device, an occurrence of clearance criteria during the monitored audio call, the detected clearance criteria being associated with the second party saying specific phrases after the display of the output directive;

automatically detecting, by the computing device, a result of outputting the directive to the second party to the audio call, by monitoring a subsequent response of the first party after the occurrence of the clearance criteria;

automatically generating, by the computing device, a report documenting the occurrence of the specific trigger during the monitored audio call, the resulting outputting of the directive to the second party to the audio call, and the detected result of the outputting of the directive; and wherein the report has a selectable level of granularity for reporting, including at least one of: 1) triggers occurring most frequently during given types of audio calls, 2) which real-time directives are displayed most frequently over given time intervals.

13. The method of claim 12 further comprising: wherein the report has a selectable level of granularity for reporting further including at least one of
improvements in audio call outcomes with real-time directive usage, and clearance of real-time directives.

14. The method of claim 12, wherein the report comprises:
information concerning the occurrence of the specific trigger during the monitored audio call, the resulting outputting of the directive to the second party to the audio call, and the detected result of the outputting of the directive, by the computing device, in real-time while the audio call is occurring.

15. The method of claim 12 further comprising:
tracking occurrence of triggers, corresponding outputting of directives, and corresponding results of outputting of directives, during multiple monitored audio calls, by the computing device.

16. The method of claim 15 further comprising:
compiling, by the computing device, statistics concerning occurrences of triggers, corresponding outputting of directives, and corresponding results of outputting of directives tracked during multiple monitored audio calls.

17. The method of claim 15 further comprising:
applying machine learning techniques to the tracked occurrences of triggers, corresponding outputting of directives, and corresponding results; and
in response to results of applying the machine learning techniques, performing at least one of the following actions: creating a new trigger, editing an existing trigger, editing an existing directive corresponding to at least one trigger, and creating a new directive corresponding to at least one trigger.

18. A computer implemented method, comprising:
automatically monitoring, by a computing device, an audio call, in real-time while the audio call is occurring, wherein the audio call is between a first party at a first calling device and a second party at a second calling device;
performing speech recognition, by the computing device, on the audio call, in real-time while the audio call is occurring, automatically detecting, by the computing device, an occurrence of a specific trigger during the monitored audio call based on a determination of a specific keyword or combination of keywords said by the first party to the audio call;

in response to detecting the occurrence of the specific trigger, automatically outputting, by the computing device, a directive to the second party to the audio call, on a screen of a second calling device operated by the second party to the audio call, the output directive corresponding to a suggested response of the second party to one or more complaints of the first party based on the occurrence of the specific trigger said by the first party;

automatically detecting, by the computing device, a result of outputting the directive to the second party to the audio call, by monitoring a subsequent response of the first party;

tracking occurrence of triggers, corresponding outputting of directives, and corresponding results of outputting of directives;

applying machine learning techniques to the tracked occurrences of triggers, corresponding outputting of directives, and corresponding results;

in response to results of applying the machine learning techniques, performing at least one of the following actions: creating a new trigger, editing an existing trigger, editing an existing directive corresponding to at least one trigger, and creating a new directive corresponding to at least one trigger automatically generating, by the computing device, a report documenting the occurrence of the specific trigger during the monitored audio call, the resulting outputting of the directive to the second party to the audio call, and the detected result of the outputting of the directive; and wherein the report has a selectable level of granularity for reporting, including at least one of: 1) triggers occurring most frequently during given types of audio calls, 2) which real-time directives are displayed most frequently over given time intervals.

19. A computer implemented method, comprising:
automatically monitoring, by a computing device, an audio call, in real-time while the audio call is occurring, wherein the audio call is between a first party at a first calling device and a second party at a second calling device, wherein the first party is a customer and the second party is an agent;

performing speech recognition, by the computing device, on the audio call, in real-time while the audio call is occurring, automatically detecting, by the computing device, an occurrence of a specific trigger during the monitored audio call based on a determination of a specific keyword or combination of keywords said by the first party to the audio call;

in response to detecting the occurrence of the specific trigger, automatically outputting, by the computing device, a directive to the second party to the audio call, on a screen of a second calling device operated by the second party to the audio call, the output directive corresponding to a suggested response of the second party to a complaint of the first party based on the occurrence of the specific trigger said by the first party;

automatically detecting, by the computing device, an occurrence of clearance criteria during the monitored audio call, the detected clearance criteria being associated with the second party saying specific phrases after the display of the output directive;

automatically detecting, by the computing device, a result of outputting the directive to the second party to the audio call, by monitoring a subsequent response of the first party after the occurrence of the clearance criteria;

automatically generating, by the computing device, a report documenting the occurrence of the specific trigger during the monitored audio call, the resulting outputting of the directive to the second party to the audio call, and the detected result of the outputting of the directive; and wherein the report has a selectable level of granularity for reporting, including at least one of: 1) triggers occurring most frequently during given types of calls, 2) which real-time directives are displayed most frequently over given time intervals.

20. The method of claim 19, wherein the report has a selectable level of granularity for reporting further including at least one of improvements in audio call outcomes with real-time directive usage and clearance of real-time directives.

21. The method of claim 19, wherein the report comprises:

information concerning the occurrence of the specific trigger during the monitored audio call, the resulting outputting of the directive to the second party to the audio call, and the detected result of the outputting of the directive, by the computing device, in real-time while the audio call is occurring.

22. A computer implemented method, comprising:

automatically monitoring, by a computing device, audio calls in real-time while each audio call is occurring between a customer and an agent;

automatically detecting, by the computing device, an occurrence of a specific trigger during each monitored audio call based on a determination of a specific keyword or combination of keywords said by the customer to the audio call;

in response to detecting the occurrence of the specific trigger, automatically outputting, by the computing device, a directive to the agent, corresponding to a suggested response of the agent to questions, objections, and complaints of the customer based on the occurrence of the specific trigger said by the customer;

automatically generating, by the computing device, a report documenting the detection of the specific trigger during the monitored audio calls and the resulting outputting of the directives to the agent to the audio call;

wherein the report has a selectable level of granularity for reporting at least one of: 1) triggers occurring most frequently during given types of audio calls and 2) which real-time directives are displayed most frequently over given time intervals.

* * * * *